D. D. CARNES.
STALK CUTTER.
APPLICATION FILED MAR. 21, 1914.
1,131,907.
Patented Mar. 16, 1915.
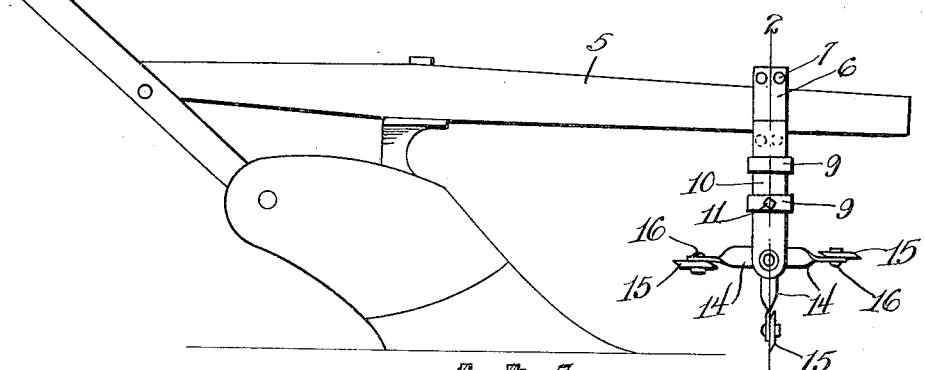
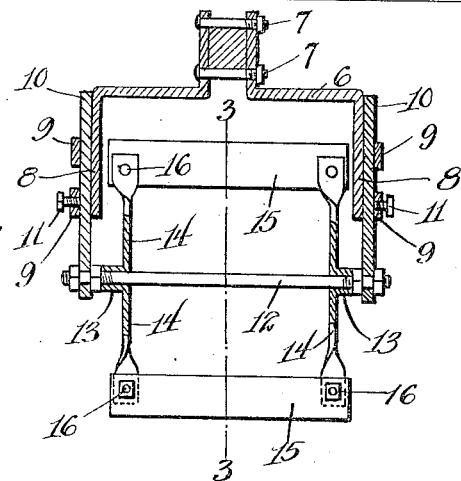
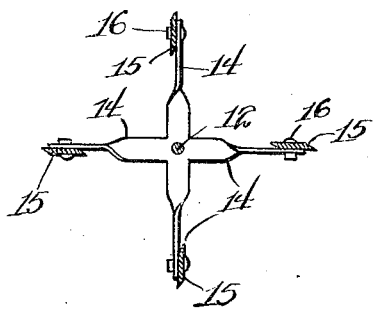
Witnesses
Robert M. Sutphen
A. L. Hird
Inventor
D. D. Carnes
By Watson E. Coleman
Attorney

UNITED STATES PATENT OFFICE.

DUDLEY DON CARNES, OF LOTT, TEXAS.

STALK-CUTTER.

1,131,907. Specification of Letters Patent. Patented Mar. 16, 1915.

Application filed March 21, 1914. Serial No. 826,287.

*To all whom it may concern:*

Be it known that I, DUDLEY D. CARNES, a citizen of the United States, residing at Lott, in the county of Falls and State of Texas, have invented certain new and useful Improvements in Stalk-Cutters, of which the following is a specification, reference being had to the accompanying drawings.

This invention relates to an improved stalk cutter and has for its primary object to provide a very simple, durable, and serviceable device of this character which may be advantageously employed for clearing a field of corn stalks as the same is plowed.

The invention has for another of its objects to provide a rotary cutter having a plurality of cutting blades, a support for said cutter adapted for attachment to a plow beam, and means for easily and quickly adjusting the cutter upon said support.

The invention has for still another object to provide a device of the above character wherein the stalk cutting blades may be very easily and quickly removed and sharpened when necessary without necessitating the entire removal of the device from the plow.

With the above and other objects in view, my invention consists in certain novel constructions, combinations, and arrangements of parts as hereinafter more fully described, claimed, and illustrated in the accompanying drawings, in which—

Figure 1 is a side elevation showing my improved stalk cutter mounted upon a plow beam; Fig. 2 is a section taken on the line 2—2 of Fig. 1; and Fig. 3 is a section taken on the line 3—3 of Fig. 2.

Referring in detail to the drawing, 5 designates the plow beam to which the hanger bars 6 are adapted to be removably secured in any desired position by means of bolts 7. Each of these hanger bars has a horizontally disposed portion extending laterally from one side of the plow beam, and a longitudinally projected lower end portion 8. This lower end portion of the hanger bar is provided with sleeves or loops 9 which serve as guides for the extensible bars 10. These bars may be securely held in their adjusted positions by means of set screws 11 which are threaded in one of said guide loops.

In the lower ends of the bars 10 a rod or shaft 12 is journaled. Upon this shaft the spaced heads 13 of the cutter proper are rigidly fixed. Each of these heads is formed with radially extending twisted arms 14 to the outer ends of which the ends of the cutting blades 15 are removably secured by means of the bolts 16. Each of the longitudinal edges of these blades is preferably sharpened to a cutting edge so that the blades may be reversed upon the ends of the arms 14 when one edge thereof becomes dull. The individual blades may also be very easily and quickly removed from the arms 14 when it is necessary to sharpen the same.

From the foregoing description, taken in connection with the accompanying drawing, it is believed that the construction and manner of operation of the device will be clearly and fully understood.

In the plowing of a field, the stalk cutter which is arranged in advance of the plow point, cuts the stalks close to the ground, said cutter being revolved by its engagement with the ground surface as the plow is drawn across the field.

By means of my device, it is unnecessary to go over the field a second time in order to remove the stalks, and by cutting the same in advance of the plow, liability of injury to the latter is obviated and the easy plowing of the field facilitated.

In the manner above explained, the cutter may be very easily and quickly adjusted as desired, with respect to the plow beam so that the cutting blades will properly engage the stalks and cut very close to the ground surface.

While I have shown and described the preferred construction and arrangement of the several elements, it is to be understood that the invention is susceptible of considerable modification therein and I therefore reserve the privilege of resorting to all such legitimate changes as may be fairly embodied within the spirit and scope of the appended claim.

What is claimed is:—

The herein described stalk cutter including spaced hanger bars adapted to be secured at one of their ends upon opposite sides of a beam, the other ends of said bars depending in parallel relation to each other and being each provided upon its outer face with spaced rectangular sleeves, supporting bars loosely engaged in said sleeves for vertical movement and capable of being drawn upwardly out of the sleeves to remove said bars from connection with the hanger bars, a set screw carried by one of the sleeves of each hanger bar to clamp the supporting bar associated therewith in its adjusted position against the outer face of the hanger bar, and a rotatable stalk cutter mounted in the lower ends of said supporting bars.

In testimony whereof I hereunto affix my signature in the presence of two witnesses.

DUDLEY DON CARNES.

Witnesses:
B. C. NABERS,
H. A. PATTON.

Copies of this patent may be obtained for five cents each, by addressing the "Commissioner of Patents, Washington, D. C."